United States Patent [19]

Ko

[11] Patent Number: 5,516,155
[45] Date of Patent: May 14, 1996

[54] WATER PIPE CONNECTING STRUCTURE

[75] Inventor: Hsi-Chia Ko, Changhua Hsien, Taiwan

[73] Assignee: Chung Cheng Faucet Co. Ltd., Taiwan

[21] Appl. No.: 429,183

[22] Filed: Apr. 26, 1995

[51] Int. Cl.⁶ ..................................... F16L 25/00
[52] U.S. Cl. ................ 285/12; 285/256; 285/334.1; 285/354; 285/910
[58] Field of Search ............ 285/334.3, 354, 285/12, 256, 334.1, 910

[56] References Cited

U.S. PATENT DOCUMENTS

| | | | |
|---|---|---|---|
| 4,611,828 | 9/1986 | Brunet | 285/354 X |
| 4,991,876 | 2/1991 | Mulvey | 285/354 X |
| 5,024,419 | 6/1991 | Mulvey | 285/354 X |
| 5,364,135 | 11/1994 | Anderson | 285/334.3 X |

*Primary Examiner*—Dave W. Arola
*Attorney, Agent, or Firm*—Beveridge, DeGrandi, Weilacher & Young

[57] ABSTRACT

A water pipe connecting structure composed of a hexagonal locking nut, a coupling pipe, a connecting pipe, a metal fastening sleeve and a conic watertight washer. The locking nut has an inner flange at one end. The coupling pipe is divided by an expansion neck portion into an upper head portion and a lower binding portion formed with several slideproof check rings. The coupling pipe is fitted into the locking nut with the expansion neck abutting against the inner flange of the locking nut and with the binding portion extending through the inner flange to insert into the fastening sleeve fitted with one end of the connecting pipe. The fastening sleeve receiving the binding portion is rolled and pressed so as to bind therewith. An outer flange is formed at a top end of the head portion of the coupling pipe. The outer flange has an inclined outer periphery for engaging with the washer and preventing the same from dropping out. The conic washer has a plane flange and is positioned around the head portion of the coupling pipe. The inclined periphery of the outer flange of the head portion is flush with a conic surface of the washer, and the conic surface of the washer is adapted to watertightly abut against an arch reverse angle of an open end of a water incoming pipe screwed in the locking nut. Alternatively, the plane flange of the washer can watertightly abut against a plane open end of a water incoming pipe screwed in the locking nut.

4 Claims, 3 Drawing Sheets

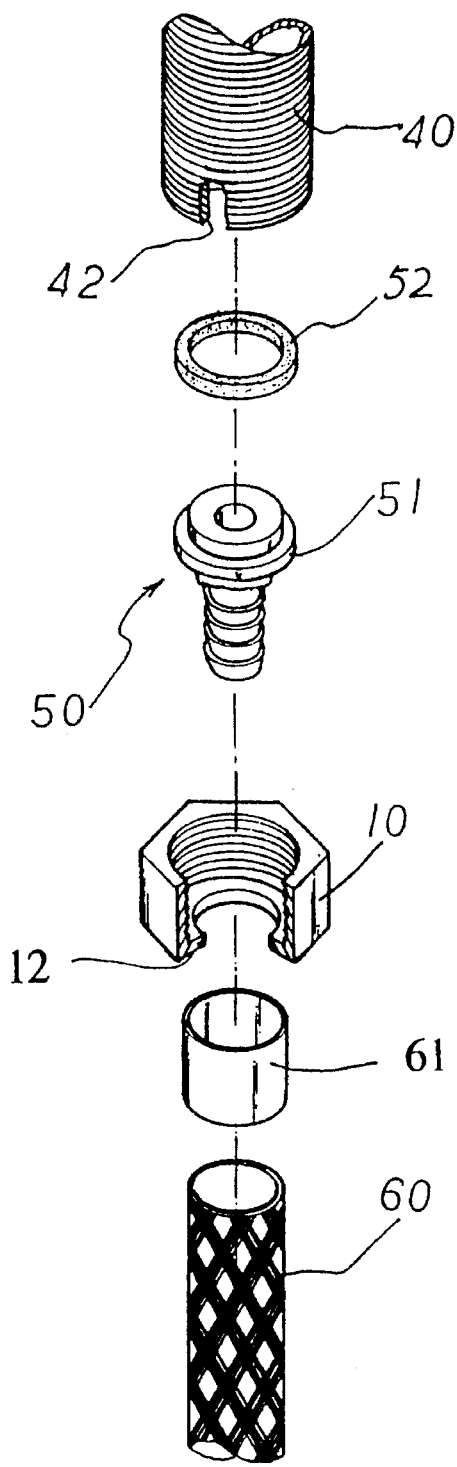
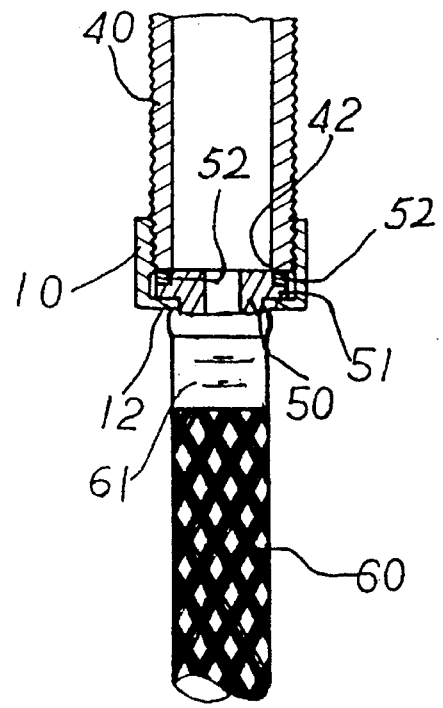
FIG. 4
PRIOR ART
FIG. 3
PRIOR ART

WATER PIPE CONNECTING STRUCTURE

BACKGROUND OF THE INVENTION

The present invention relates to an improved water pipe connecting structure composed of a hexagonal locking nut, a coupling pipe, a connecting pipe, a metal fastening sleeve and a conic watertight washer. The connecting structure is adapted to watertightly connect with a water incoming pipe having an opening with arch reverse angle or having a plane open end.

FIG. 1 shows a conventional water pipe connecting structure which includes a hexagonal locking nut 10 formed with an arch inner flange 11 at one end, and an arch copper fitting 30 disposed in the locking nut 10. A lower arch surface 31 of the copper fitting 30 is snugly engaged with the arch inner flange 11, and a hard connecting pipe 20 is extended into the locking nut 10 and the copper fitting 30. Referring to FIG. 2, a water incoming pipe 40 having an open end with an inner reverse angle 41 is extended into the locking nut 10 with the reverse angle 41 engaged with an upper arch surface 32 of the copper fitting 30, whereby when the locking nut 10 is tightened to force the water incoming pipe 40 inward, the copper fitting 30 is binded with the hard connecting pipe 20.

Several shortcomings exist in such conventional connecting structure as follows:

1. The hard copper fitting can hardly reliably bind around the hard connecting pipe 20 and is apt to loosen and depart therefrom.

2. The engagement between the hard copper fitting and hard connecting pipe can hardly achieve a watertight effect and water leakage often takes place.

3. The conventional connecting structure is only suitable for a water incoming pipe having an open end with an inner reverse angle.

In order to solve the above problems, an improved connecting structure is developed as shown in FIG. 3, wherein the hexagonal locking nut 10 has an inner flange 12 at one end, and a coupling pipe 50 having an expansion neck portion 51 is fitted into the locking nut 10 with the neck portion 51 abutting against the inner flange 12 and a lower portion passing therethrough to insert into a metal fastening sleeve fitted with one end of a connecting pipe. The fastening sleeve receiving the lower portion is rolled and pressed so as to bind therewith. A plane watertight washer 52 is disposed around a head portion of the coupling pipe 50 above the neck portion 51 and a water incoming pipe 40 having a plane open end 42 is screwed into the locking nut 10 to watertightly engage with the washer 52 as shown in FIG. 4.

The above arrangement still has the following disadvantages:

1. The washer is apt to be deformed by the open end of the water incoming pipe, and after the locking nut is loosened, the washer tends to attach to the open end and then drop down. When re-loaded, the deformed washer can hardly snugly engage with the coupling pipe to achieve the watertight effect.

2. The plane watertight washer is only suitable for the water incoming pipe with a plane open end.

Therefore, it is necessary to provide an improved water pipe connecting structure which is able to firmly connect different water incoming pipes having different types of open ends while achieving a reliable watertight effect.

SUMMARY OF THE INVENTION

It is therefore a primary object of the present invention to provide an improved water pipe connecting structure having a locking nut and a coupling pipe. An outer flange is formed at a top end of a head portion of the coupling pipe. The outer flange has an inclined outer periphery for engaging with the washer and preventing the same from dropping out. In addition, the inclined periphery of the outer flange of the head portion is flush with a conic surface of the washer, and the conic surface of the washer is adapted to snugly abut against an arch reverse angle of the open end of the water incoming pipe, whereby the water incoming pipe can be screwed into the locking nut and firmly engaged with the washer to achieve a reliable watertight effect.

It is a further object of the present invention to provide the above connecting structure in which the conic washer has a plane flange and is positioned around the head portion of the coupling pipe, whereby (a) the conic surface of the washer is adapted to watertightly abut against an arch reverse angle of the open end of water incoming pipe screwed in the locking nut, or (b) the plane flange of the washer can watertightly abut against a plane open end of a water incoming pipe screwed in the locking nut.

According to the above objects, the connecting structure of the present invention is mainly composed of a hexagonal locking nut, a coupling pipe, a connecting pipe, a metal fastening sleeve and a conic watertight washer. The locking nut has an inner flange at one end and the coupling pipe is divided by an expansion neck portion into an upper head portion and a lower binding portion formed with several slideproof check rings. The coupling pipe is fitted into the locking nut with the expansion neck abutting against the inner flange of the locking nut and with the binding portion extending through the inner flange to insert into the fastening sleeve fitted with one end of the connecting pipe. The fastening sleeve receiving the binding portion is rolled and pressed so as to bind therewith. An outer flange is formed at a top end of the head portion of the coupling pipe. The outer flange has an inclined outer periphery for engaging with the washer and preventing the same from dropping out. The conic washer has a plane flange and is positioned around the head portion of the coupling pipe. The inclined periphery of the outer flange of the head portion is flush with a conic surface of the washer, and the conic surface of the washer is adapted to watertightly abut against an arch reverse angle of the open end of the water incoming pipe screwed in the locking nut or the plane flange of the washer can watertightly abut against a plane open end of the water incoming pipe screwed in the locking nut.

The present invention can be best understood through the following description and accompanying drawings, wherein:

BRIEF DESCRIPTION OF THE DRAWINGS

FIG. 3 is a perspective exploded view of another conventional water pipe connecting structure;

FIG. 4 is a sectional assembled view of the assembly of FIG. 3;

DETAILED DESCRIPTION OF THE PREFERRED EMBODIMENT

Figure 5:
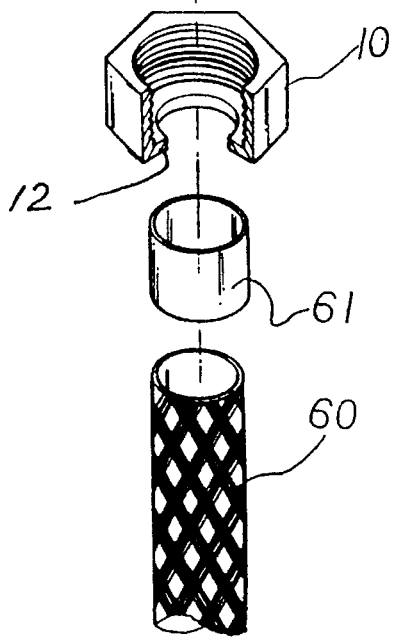
FIG. 5 is a perspective exploded view of the present invention.

Please refer to FIG. 5. The present invention mainly includes a hexagonal locking nut 10, a coupling pipe 70, a connecting pipe 60, a metal fastening sleeve 61 and a conic watertight washer 80.

Figure 1:
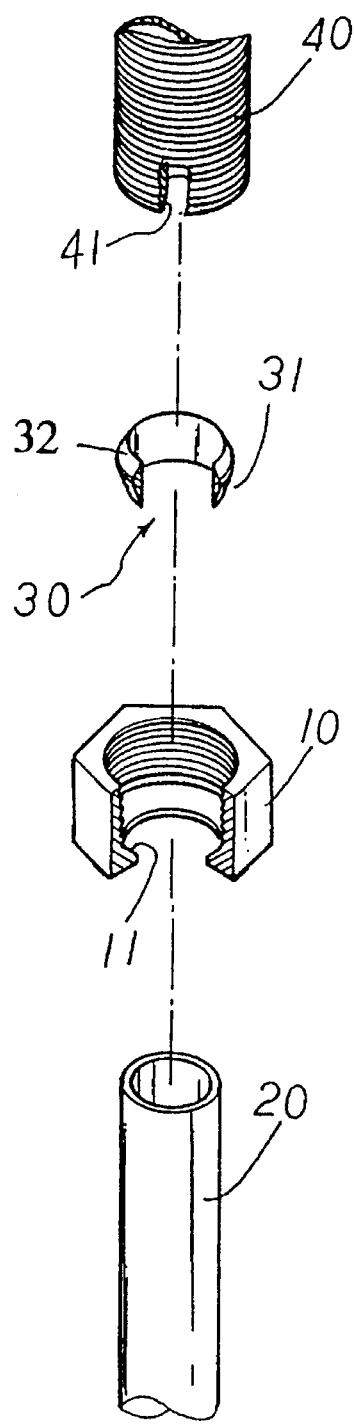
FIG. 1 is a perspective exploded view of a conventional water pipe connecting structure.
Figure 2:
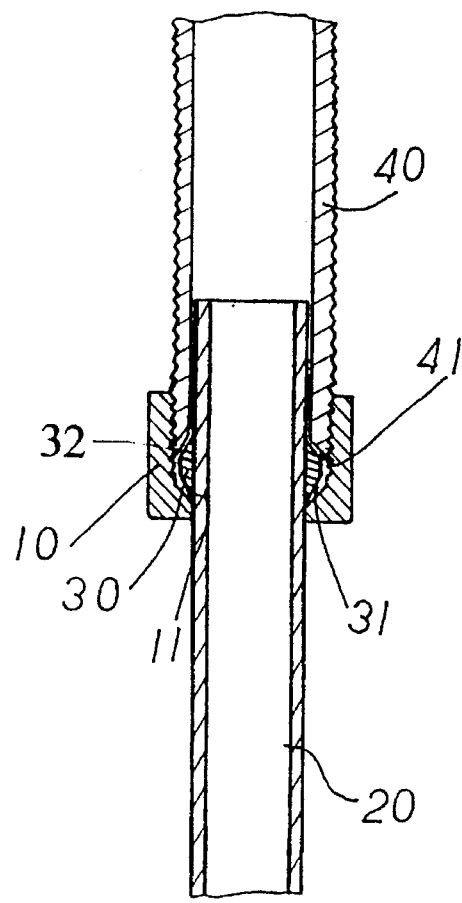
FIG. 2 is a sectional assembled view of the assembly of FIG. 1.
Figure 7:
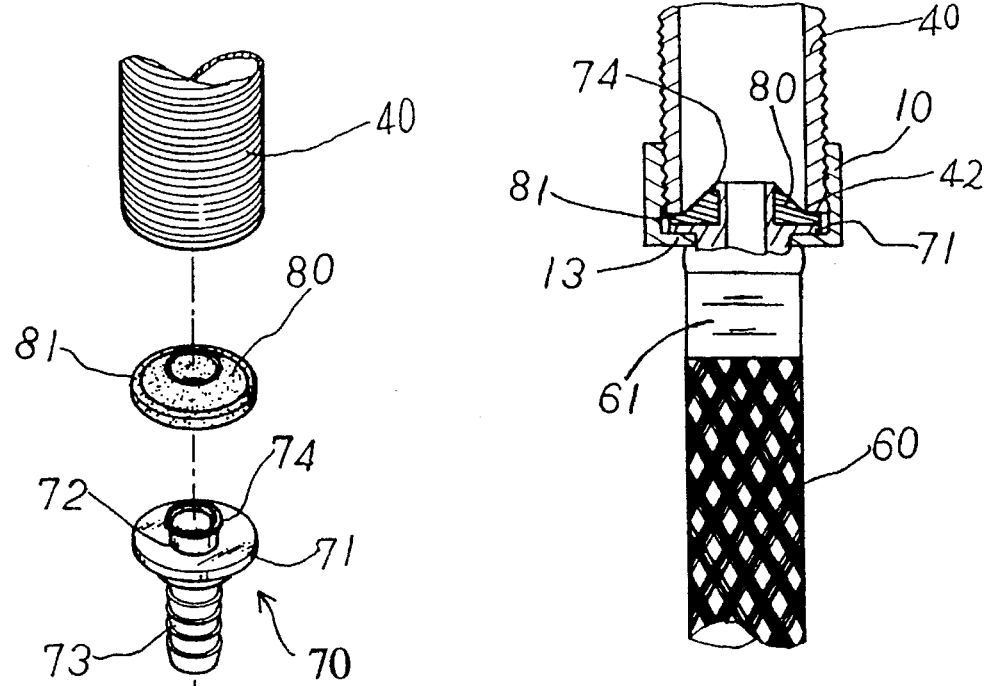
FIG. 7 is a sectional assembled view of the assembly of FIG. 5, in which the present invention is applied to a water incoming pipe having a plane open end.
Figure 6:
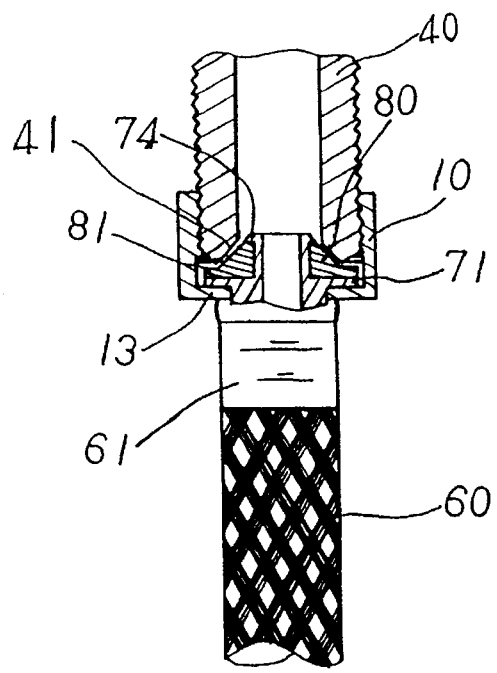
FIG. 6 is a sectional assembled view of the assembly of FIG. 5, in which the present invention is applied to a water incoming pipe having an open end with a reverse angle.

The locking nut 10 has an inward extending flange 12 at one end. The coupling pipe 70 is divided by an expansion neck portion 71 into an upper head portion 72 and a lower binding portion 73 formed with several slideproof check rings. An outward extending flange 74 is formed at a top end of the head portion 72 of the coupling pipe 70. The flange 74 has an inclined outer periphery, whereby the coupling pipe 70 can be fitted into the locking nut 10 with the expansion neck 71 abutting against the inner flange 12 of the locking nut 10 and with the binding portion 73 extending through the inner flange 12 to insert into the fastening sleeve 61 fitted with one end of the connecting pipe 60. The fastening sleeve 61 receiving the binding portion 73 is rolled and pressed so as to bind therewith to form the assembly as shown in FIG. 6 or FIG. 7. The conic washer 80 has a plane flange 81 and is positioned around the head portion 72 of the coupling pipe 70. The outer flange 74 of the head portion 72 serves to engage with the washer 80 and prevent the same from dropping out. The inclined periphery of the outer flange 74 is flush with the conic surface of the washer 80, whereby a water incoming pipe 40 having an open end with an arch reverse angle can be easily screwed into the locking nut 10 and snugly opposed against the surface of the washer 80 to achieve a watertight effect. As shown in FIG. 6, the conic surface of the washer 80 is adapted to watertightly abut against the arch reverse angle of the open end of the water incoming pipe 40 screwed in the locking nut 10. Alternatively, as shown in FIG. 7, the plane flange 81 of the washer 80 can watertightly abut against a plane open end 42 of the water incoming pipe 40 screwed in the locking nut 10.

The above embodiment is only an example of the present invention, and the scope of the present invention should not be limited to the example. Any modification or variation derived from the example should fall within the scope of the present invention.

What is claimed is:

1. A water pipe connecting structure, comprising: a hexagonal locking nut, a coupling pipe, a connecting pipe, a metal fastening sleeve and a conic watertight washer, wherein the locking nut has an inward extending inner flange at one end, and the coupling pipe is divided by an expansion neck portion into an upper head portion and a lower binding portion having several slideproof check rings, wherein the coupling pipe is received in the locking nut with the expansion neck portion abutting against the inner flange of the locking nut and with the binding portion extending through the inner flange into the connecting pipe, said fastening sleeve surrounding said connecting pipe and binding portion wherein the fastening sleeve is rolled and pressed so as to bind the connecting pipe with the binding portion of the coupling pipe, wherein the coupling pipe includes an outward extending outer flange formed at a top end of the head portion of the coupling pipe, the outer flange having an inclined outer periphery, said expansion neck portion and outer flange engaging with the washer and preventing the washer from dropping out of the coupling pipe, the conic washer having a conic surface and a plane flange and being positioned around the head portion of the coupling pipe between said expansion neck portion and outer flange, wherein the inclined periphery of the outer flange of the head portion is flush with said conic surface of the washer, so that when a water incoming pipe having an open end with an arch reverse angle is screwed into the locking nut and snugly opposed against the washer to achieve a watertight effect, the conic surface of the washer is watertightly abutted against the arch reverse angle of the open end of the water incoming pipe screwed in the locking nut, and when a water incoming pipe having a plane open end is screwed into the locking nut, the plane flange of the washer is watertightly abutted against the plane open end of the water incoming pipe screwed in the locking nut.

2. A water pipe connecting structure, comprising:

a hexagonal locking nut, wherein the hexagonal locking nut includes an inward extending inner flange at one end;

a coupling pipe, wherein the coupling pipe includes an expansion neck portion which separates the coupling pipe into an upper head portion and a lower binding portion, wherein the lower binding portion includes plural slideproof check rings, wherein the head portion includes an outward extending outer flange, the outer flange having an inclined outer periphery, and wherein the coupling pipe is received in the hexagonal locking nut such that the expansion neck abuts against the inner flange of the locking nut;

a connecting pipe, wherein a fastening sleeve is connected at one end of the connecting pipe, and wherein the binding portion of the coupling pipe extends through the inner flange of the hexagonal locking nut and into the connecting pipe, said fastening sleeve being pressed onto the connecting pipe to connect the connecting pipe with the binding portion of the coupling pipe; and a conic watertight washer including a conic surface and a plane flange, wherein the outer flange of the head portion of the coupling pipe and the expansion neck portion engage with the washer and prevents the washer from separating from the coupling pipe, wherein the conic washer is positioned around the head portion of the coupling pipe between said outer flange and expansion neck portion such that the inclined outer periphery of the outer flange of the head portion is flush with the conic surface of the washer, so that when a water incoming pipe having an open end with an arch reverse angle is screwed into the locking nut, the conic surface of the washer is watertightly abutted against the arch reverse angle of the open end of the water incoming pipe, and when a water incoming pipe having a plane open end is screwed into the locking nut, the plane flange of the washer is watertightly abutted against the plane open end of the water incoming pipe.

3. A water pipe connecting structure, comprising:

a locking nut, wherein the locking nut includes an inward extending flange at one end;

a coupling pipe, wherein the coupling pipe includes an expansion neck portion which separates the coupling pipe into a head portion and a binding portion, wherein the head portion includes an outward extending flange having an inclined outer periphery, and wherein the coupling pipe is received in the locking nut such that the expansion neck portion is stopped by the inwardly extending flange of the locking nut;

a connecting pipe including a fastening sleeve at one end, wherein the binding portion of the coupling pipe extends through the inwardly extending flange of the locking nut and into the connecting pipe and said fastening sleeve is pressed onto the connecting pipe to thereby connect the coupling pipe with the connecting pipe; and a washer including a conic surface and a plane flange, wherein the outward extending flange of the head portion of the coupling pipe and the expansion neck portion prevents the washer from separating from the coupling pipe, wherein the washer is positioned around the head portion of the coupling pipe between said outer flange and expansion neck portion such that the inclined outer periphery of the outward extending flange is flush with the conic surface of the washer, so that when a water incoming pipe having an open end with an arch reverse angle is connected to the locking nut, the conic surface of the washer is watertightly abutted against the arch reverse angle of the open end of the water incoming pipe, and when a water incoming pipe having a plane open end is connected to the locking nut, the plane flange of the washer is watertightly abutted against the plane open end of the water incoming pipe.

4. A water pipe connecting structure according to claim 3, wherein the binding portion includes plural slideproof check rings.

* * * * *